United States Patent
Jeong et al.

(10) Patent No.: US 11,465,912 B2
(45) Date of Patent: Oct. 11, 2022

(54) POROUS MANGANESE OXIDE NANOPARTICLES AND METHOD FOR PREPARING THE SAME

(71) Applicant: INDUSTRY-ACADEMIC COOPERATION FOUNDATION, YONSEI UNIVERSITY, Seoul (KR)

(72) Inventors: Hyung Mo Jeong, Chuncheon-si (KR); Kyu Hyoung Lee, Seoul (KR)

(*) Notice: Subject to any disclaimer, the term of this patent is extended or adjusted under 35 U.S.C. 154(b) by 119 days.

(21) Appl. No.: 16/865,491

(22) Filed: May 4, 2020

(65) Prior Publication Data
US 2020/0369530 A1 Nov. 26, 2020

(30) Foreign Application Priority Data
May 20, 2019 (KR) .................... 10-2019-0058532

(51) Int. Cl.
*C01G 45/02* (2006.01)
*C25B 1/00* (2021.01)

(52) U.S. Cl.
CPC ............ *C01G 45/02* (2013.01); *C25B 1/00* (2013.01); *C01P 2004/04* (2013.01); *C01P 2004/50* (2013.01); *C01P 2004/64* (2013.01); *C01P 2006/12* (2013.01); *C01P 2006/16* (2013.01)

(58) Field of Classification Search
CPC .. C01G 45/02; C01P 2002/02; C01P 2004/50; C01P 2004/64; C01P 2006/12; C01P 2006/16
See application file for complete search history.

(56) References Cited

U.S. PATENT DOCUMENTS

2013/0108542 A1* 5/2013 Jung .................... C01G 45/02
977/773

FOREIGN PATENT DOCUMENTS

| KR | 10-2009-0007451 | 1/2009 |
|---|---|---|
| KR | 10-1184730 | 9/2012 |

OTHER PUBLICATIONS

Geng et al., δ-MnO2—Mn3O4 Nanocomposite for Photochemical Water Oxidation: Active Structure Stabilized in the Interface,ACS Appl. Mater. Interfaces 2016, 8, 27825-27831 | DOI: 10.1021/acsami.6b09984 (Year: 2016).*

Kang et al., A new strategy for synthesis of hierarchical MnO2-Mn3O3 nanocomposite via reduction-induced exfoliation of MnO2 nanowires and its application in high-performance asymmetric supercapacitor, Composites Part B 1/8 (2019) 107501 (Year: 2019).*

(Continued)

*Primary Examiner* — Hoa (Holly) Le
(74) *Attorney, Agent, or Firm* — Antonio Ha & U.S. Patent, LLC

(57) ABSTRACT

The disclosure relates to porous manganese oxide nanoparticles which include flocculated primary nanoparticles, with air pores formed between the primary nanoparticles. Unlike in the prior art, the porous manganese oxide nanoparticles of the disclosure have 6 nm or less $MnO_2$ primary nanoparticles and $Mn_3O_4$ primary nanoparticles uniformly mixed and flocculated, exhibiting a 16 times higher specific surface area as compared with the conventional manganese oxide particles and superior storage characteristics and stability.

12 Claims, 5 Drawing Sheets

(56) References Cited

OTHER PUBLICATIONS

Cui et al., Monolayer standing $MnO_2$-Nanosheet covered $Mn_3O_4$ octahedrons anchored in 3D N-Doped graphene networks as supercapacitor electrodes with remarkable cycling stability, Journal of Power Sources 396 (2018) 483-490 (Year: 2018).*
Park et al., Synthesis of Ordered Mesoporous Manganese Oxides with Various Oxidation States, J. Nanosci. Nanotechnol. 2015, vol. 15, No. 3 | doi:10.1166/jnn.2015.10263 (Year: 2015).*
English Specification of 10-1184730.
English Specification of 10-2009-0007451.
Self-Assembly of Mn3O4 Nanoparticles into Mesoporous Microstructures for Use as Supercapacitor Electrode Material, Venugopal Nulu et al., Int. J. Electrochem. Sci. 13 (2018) 8313-8321 (Aug. 5, 2018).

* cited by examiner

POROUS MANGANESE OXIDE NANOPARTICLES AND METHOD FOR PREPARING THE SAME

CROSS-REFERENCE TO RELATED APPLICATION(S)

This application is based on and claims priority under 35 U.S.C. 119 to Korean Patent Application No. 10-2019-0058532, filed on May 20, 2019, in the Korean Intellectual Property Office, the disclosure of which is herein incorporated by reference in its entirety.

TECHNICAL FIELD

The present disclosure relates to porous manganese oxide nanoparticles and a method for preparing the same, and more specifically, to porous manganese oxide nanoparticles, into which $Mn_3O_4$ primary nanoparticles and $MnO_2$ primary nanoparticles have been mixed and flocculated, and a method for preparing the same.

DISCUSSION OF RELATED ART

Manganese oxide is used as negative electrode for lithium secondary batteries. Generally, the negative electrode material requires a smaller particle size and larger specific surface area to enhance charging/discharging properties in the high current density of lithium secondary battery. Manganese oxide is used as a material for preparing lithium manganate which is used as positive active material for secondary batteries. An effective method for preparing small particle lithium manganate is to use small size manganese oxide as raw material. Manganese oxide powder may be adopted for various purposes, e.g., super capacitor electrodes, semiconductor material, sensors, pigment, catalysts, or water treatment. Thus, the smaller the particle size is, the better properties may be achieved for cobalt oxide powder. In this sense, it is critical to prepare a nanosized manganese oxide powder.

Top-down processed, which are based on milling, and bottom-up processes, which are chemical processes, have conventionally been employed to prepare nanosized metal oxide particles.

Korean Patent No. 10-1184730 discloses a top-down process for preparing a nano powder by milling cerium oxide powder slurry twice, with the RPM controlled. Korean Patent Application Publication No. 10-2009-0007451 discloses a method for preparing a cerium oxide nano powder containing cerium oxide particles with a particle size of 100 nm or more. This prior art regards a bottom-up process for preparing cerium oxide nana particles by forming cerium hydroxide sediment by mixing a cerium salt and an alkali solution and then performing hydrothermal synthesis.

However, such conventional methods fail to prepare manganese oxide particles with a particle size of 10 nm or less.

Further, upon using manganese oxide as electrode material for lithium secondary batteries, it may be effective to mix $MnO_2$ which has superior lithium ion storage characteristics, and $Mn_3O_4$ which shows high stability.

The conventional methods to prepare a mixed powder of $Mn_3O_4$ and $MnO_2$ are to individually prepare a $Mn_3O_4$ powder and an $MnO_2$ powder and then mix them up. Thus, the blend uniformity issue ensues.

SUMMARY

According to an embodiment, there are provided porous manganese oxide nanoparticles which have a 16 times higher specific surface area in unit volume than the conventional manganese oxide particles and, when applied to batteries, exhibit superior storage characteristics and stability because they have 6 nm or less $MnO_2$ nanoparticles and $Mn_3O_4$ nanoparticles mixed and flocculated.

According to an embodiment, there is provided a method for preparing porous manganese oxide nanoparticles in the form of 6 nm or less $MnO_2$ primary nanoparticles and $Mn_3O_4$ primary nanoparticles mixed and flocculated by separating Mn clusters by injecting positive ions into the $Mn_3O_4$ lattices.

According to an embodiment, there are provided porous manganese oxide nanoparticles configured in a form of flocculated primary nanoparticles represented as in chemical formula 1 and primary nanoparticles represented as in chemical formula 2, wherein air pores are formed between the primary nanoparticles, wherein $$Mn_3O_{4-x} \qquad \text{[Chemical Formula 1]}$$

where $0 \leq x \leq 0.4$.

$$MnO_{2-y} \qquad \text{[Chemical Formula 2]}$$

where $0 \leq x \leq 0.2$.

In the porous manganese oxide nanoparticles, the volume ratio of the primary nanoparticles represented as in chemical formula 1 to the primary nanoparticles represented as in chemical formula 2 may range from 10% to 90%.

In the porous manganese oxide nanoparticles, the primary nanoparticles represented as in chemical formula 1 and the primary nanoparticles represented as in chemical formula 2 may be evenly or uniformly flocculated.

The size of the primary nanoparticles represented as in chemical formula 1 or 2 may be 0.3 nm to 6 nm.

The porosity of the porous manganese oxide nanoparticles may range from 10% to 40%.

The size of the air pore may range from 0.4 nm to 6 nm.

The BET specific surface area of the porous manganese oxide nanoparticles may range from 60 m²/g to 120 m²/g.

According to an embodiment, there may be provided porous manganese oxide nanoparticles prepared by forming first nanoparticles represented as in chemical formula 1 in such a method as to separate Mn clusters by injecting positive ions into lattices of $Mn_3O_4$ particles and forming second nanoparticles represented as in chemical formula 2 by partially reducing the first nanoparticles, wherein $$Mn_3O_{4-x} \qquad \text{[Chemical formula 1]}$$

where $0 \leq x \leq 0.4$.

$$MnO_2-y \qquad \text{[Chemical formula 2]}$$

where $0 \leq x \leq 0.2$.

In the porous manganese oxide nanoparticles, the volume ratio of the first nanoparticles represented as in chemical formula 1 to the second nanoparticles represented as in chemical formula 2 may range from 10% to 90%.

In the porous manganese oxide nanoparticles, the first nanoparticles represented as in chemical formula 1 and the second nanoparticles represented as in chemical formula 2 may be evenly or uniformly flocculated.

The positive ions may be positive ions of an alkaline metal or an alkaline earth metal.

The positive ions may be injected using a constant current or constant voltage method.

According to an embodiment, a method for preparing porous manganese oxide nanoparticles comprises placing an $Mn_3O_4$ thin film layer and an ion generation layer on two opposite surfaces of a separation plate and applying a voltage to the $Mn_3O_4$ thin film layer and the ion generation layer. The ion generation layer includes an alkaline metal, an alkaline earth metal, an alkaline metal-containing alloy, or an alkaline earth metal-containing alloy.

The $Mn_3O_4$ thin film layer may be formed by casting slurry on a metal sheet and drying the slurry-cast metal sheet. The slurry may be formed by mixing an $Mn_3O_4$ powder, a binder, and an organic solvent.

The ion generation layer may include an alkaline metal, an alkaline earth metal, an alkaline metal-containing alloy, or an alkaline earth metal-containing alloy.

The separation plate may be formed by wetting a porous polymer plate with an electrolyte.

Unlike in the prior art, the porous manganese oxide nanoparticles of the disclosure have 6 nm or less $MnO_2$ primary nanoparticles and $Mn_3O_4$ primary nanoparticles uniformly mixed and flocculated, exhibiting a 16 times higher specific surface area as compared with the conventional manganese oxide particles and superior storage characteristics and stability.

According to an embodiment, the method may prepare porous manganese oxide nanoparticles in the form of 6 nm or less $MnO_2$ primary nanoparticles and $Mn_3O_4$ primary nanoparticles mixed and flocculated by separating Mn clusters by injecting positive ions into the $Mn_3O_4$ lattices.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
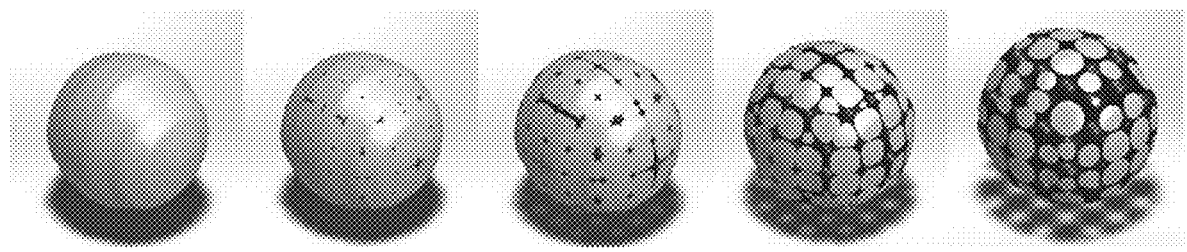
FIG. 1 is a view schematically illustrating a process for preparing porous manganese oxide nanoparticles according to an embodiment.

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings.

When determined to make the subject matter of the present disclosure unclear, the detailed description of the known art or functions may be skipped.

The terms as used herein are provided merely to describe some embodiments thereof, but not to limit the present disclosure. As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present disclosure are described in detail. However, the scope of the disclosure is not limited to the embodiments disclosed herein but is defined by the appended claims.

The disclosure relates to porous manganese oxide nanoparticles which include flocculated primary nanoparticles, with air pores formed between the primary nanoparticles.

The primary nanoparticles may be represented as in chemical formula 1 or 2 below.

$$Mn_3O_{4-x} \qquad \text{[Chemical formula 1]}$$

where $0 \le x \le 0.4$.

$$MnO_2{-}y \qquad \text{[Chemical formula 2]}$$

where $0 \le x \le 0.2$.

The primary nanoparticles mean particles that result as $Mn_3O_4$ particles have air pores built up therebetween and their bonds are broken. As positive ions are injected into the lattices, the primary nanoparticles are reduced as in chemical formula 1 or 2. Flocculation may be the gathering of primary nanoparticles that are formed as air pores build up inside the secondary particles ($Mn_3O_4$ particles), which are of the parent phase, the interparticle bonds are broken. The gaps between the primary nanoparticles may be the air pores.

The volume ratio of the primary nanoparticles represented as in chemical formula 1 to the primary nanoparticles represented as in chemical formula 2 may range from 10% to 90%.

Preferably, the primary nanoparticles represented as in chemical formula 1 and the primary nanoparticles represented as in chemical formula 2 may be evenly or uniformly flocculated.

The primary nanoparticles represented as in chemical formula 1 may exhibit excellent stability when applied to batteries, and the primary nanoparticles represented as in chemical formula 2 may show superior storage characteristics. Thus, as the primary nanoparticles represented as in chemical formula 1 and the primary nanoparticles represented as in chemical formula 2 are mixed more uniformly, better battery characteristics may be obtained. Unlike the conventional mixed powder of $Mn_3O_4$ and $MnO_2$, which is obtained by simply mixing an $Mn_3O_4$ powder and an $MnO_2$ powder, the porous manganese oxide nanoparticles, according to an embodiment, may be formed as the primary nanoparticles are mixed and flocculated, showing superior uniformity.

The size of the primary nanoparticles represented as in chemical formula 1 or 2 may be 0.3 nm to 6 nm.

The amorphous primary nanoparticles with a size less than 0.3 nm are nearly impossible to prepare, and although possible, they may be hard to use commercially. If the size of the primary nanoparticles exceeds 6 nm, no or little confinement effect of a specific size may be achieved and, thus, the increase in reaction efficiency may be limited.

The porosity of the porous manganese oxide nanoparticles may range from 10% to 40%. If the porosity is less than 10%, the passage of substrate molecules may be restricted and, thus, reactivity may be lowered. If the porosity exceeds 40%, the passage of the molecules is smooth, but a narrow confinement effect of a specific size may not arise and an increase in reaction efficiency may be limited.

The size of the air pore may range from 0.4 nm to 6 nm. If the size of the air pore is less than 0.4 nm, the passage of substrate molecules may be restricted and, thus, reactivity may be lowered. If the size of the air pore exceeds 6 nm, the passage of the molecules is smooth, but a narrow confinement effect of a specific size may not arise and an increase in reaction efficiency may be limited.

The BET specific surface area of the porous manganese oxide nanoparticles may range from 60 $m^2/g$ to 120 $m^2/g$. This is about 400 times larger than the conventional manganese oxide particles. If the BET specific surface area is less than 60 $m^2/g$, the reactivity is lowered and, if the BET specific surface area is more than 120 $m^2/g$, no narrow confinement effect of a specific size results, restricting an increase in reaction efficiency.

According to an embodiment, the porous manganese oxide nanoparticles may be prepared by forming the first nanoparticles represented as in chemical formula 1 in such a method as to separate the Mn clusters by injecting positive ions into the lattices of $Mn_3O_4$ particles and forming the second nanoparticles represented as in chemical formula 2 by partially reducing the first nanoparticles.

Specifically, if positive ions are injected into the lattices of $Mn_3O_4$ particles, lattice distortion occurs. Defects in lattice, vacancy defects, or grain boundaries are given depending on the amount of positive ions injected, and the shape and concentration are precisely controlled to form lattices with a new property. The bonds in the lattices may be broken by worsening the lattice distortion and, thus, ultrafine particles may be formed.

In the porous manganese oxide nanoparticles according to an embodiment, primary nanoparticles (i.e., the first nanoparticles) represented as in chemical formula 1 are formed by breaking the intralattice bonds in such a manner as to worsen lattice distortion and, at this time, the primary nanoparticles (i.e., the first nanoparticles) represented as in chemical formula 1 are reduced into primary nanoparticles (i.e., the second nanoparticles) represented as in chemical formula 2 by the positive ions simultaneously injected. Thus, the first nanoparticles represented as in chemical formula 1 and the second nanoparticles represented as in chemical formula 2 may be uniformly mixed and flocculated.

FIG. 1 schematically illustrates the above description. FIG. 1 illustrates a process in which as injection of positive ions worsens lattice distortion, $Mn_3O_4$ particles form air pores, and the first and second nanoparticles are mixed and flocculated into the porous manganese oxide nanoparticles.

The positive ions may be those of an alkaline metal or alkaline earth metal. For example, the positive ions may be those of lithium (Li), sodium (Na), potassium (K), magnesium (Mg), or calcium (Ca).

The positive ions may be injected by a constant current or constant voltage method.

Now described is a method for preparing porous manganese oxide nanoparticles according to an embodiment. However, embodiments of the disclosure are not limited thereto.

First, a $Mn_3O_4$ thin film layer and an ion generation layer are placed on both sides of a separation plate (step a).

Specifically, a $Mn_3O_4$ thin film layer is formed on a metal sheet, and then, the metal sheet is placed on a cathode electrode.

The $Mn_3O_4$ thin film layer may be formed by coating the metal sheet with, e.g., mixed slurry of $Mn_3O_4$ powder, a binder, and an organic solvent. The binder may include polyvinylidene fluoride (PVDF), Nafion, poly(acrylic acid) (PAA), carboxymethyl cellulose (CMC), styrene-butadiene rubber (SBR), polytetrafluoroethylene (PTFE), or poly(ethylene oxide).

The organic solvent may include N-Methyl-2-Pyrrolidone (NMP), ethanol, tetrahydrofuran (THF), benzene, KOH/MeOH, MeOH, toluene, $CH_2Cl_2$, hexane, dimethylformamide (DMF), di-isopropyl ether, diethyl ether, dioxane, dimethylacetamide (DMA), dimethyl sulfoxide (DMSO), or chlorobenzene.

The slurry may further include a conducting agent, such as super-p, Ketjenblack, acetylene black, sfg6, or CNT.

The weight ratio of the $Mn_3O_4$ powder to the binder in the slurry may be 90:10 to 99:1.

The weight ratio of the mixture of the $Mn_3O_4$ powder and the binder to the organic solvent may be 10 mg to 0.01 mL through 1 mL.

The weight ratio of the conducting agent to the slurry may be 0.1 mg through 0.5 mg to 10 mg.

The metal sheet may include a copper, aluminum, silver, or stainless steel sheet. As the metal sheet, any metal sheet with good conductivity may be used. A metal sheet with a reduction potential higher than about 0.0V vs. RHE may be electrochemically preferable.

The thickness of the metal sheet may range from 10 μm to 100 μm.

The thickness of the $Mn_3O_4$ thin film layer may range from 10 μm to 400 μm.

The cathode electrode may include stainless steel, aluminum, titanium, copper, nickel, or an alloy thereof. Other various metals or alloys with oxide film passivity may be adopted for the metal sheet.

The thickness of the cathode electrode may range from 10 μm to 1,000 μm.

Next, an ion generation layer is formed on an anode electrode.

The ion generation layer may include an alkaline metal, an alkaline earth metal, an alkaline metal-containing alloy, or an alkaline earth metal-containing alloy, preferably lithium (Li), sodium (Na), potassium (K), magnesium (Mg), or calcium (Ca). The ion generation layer may be in the form of a metal sheet.

The thickness of the ion generation layer may range from 10 μm to 1,000 μm.

The anode electrode may include stainless steel, aluminum, titanium, copper, nickel, or an alloy thereof. Other various metals or alloys with oxide film passivity may be adopted for the metal sheet.

The thickness of the anode electrode may range from 10 μm to 1,000 μm.

The anode electrode and the cathode electrode are connected to terminals to which voltage is applied from the outside.

Then, the $Mn_3O_4$ thin film layer and the ion generation layer are placed on both sides of a separation plate.

The separation plate may be formed by wetting a porous polymer plate with an electrolyte.

The porous polymer plate may include, e.g., polypropylene (PP), polyethylene (PE), polytetrafluoroethylene (PTFE), alumina-coated polypropylene, cellulose, or polypropylene-polyethylene-polypropylene plate.

The thickness of the porous polymer plate may range from 10 μm to 1,000 μm.

The electrolyte may contain metal ions which are included in the ion generation layer.

Specifically, the electrolyte may include $MPF_6$ (where M is the alkaline and alkaline earth metal ion)-dissolved ethylene carbonate (EC), diethyl carbonate (DEC), dimethyl carbonate (DMC), or other organic solvent solution or aqueous solution.

If the thickness of each layer is less than the lower limit, the layer may be easily torn and, if exceeding the upper limit, the layers may be difficult to join together due to an increase in the overall thickness.

Thereafter, a voltage is applied to the $Mn_3O_4$ thin film layer and the ion generation layer (step b).

If a voltage is applied to the $Mn_3O_4$ thin film layer and the ion generation layer, the potential difference causes oxidation, allowing alkaline metal or alkaline earth metal ions to build up on the ion generation layer. The alkaline metal or alkaline earth metal ions are dissolved in the electrolyte and pass through the separation plate to the $Mn_3O_4$ thin film layer. The separation plate, although electrically insulated, may allow ions to pass through. The alkaline metal or alkaline earth metal ion generated from the ion generation layer trigger reduction on the $Mn3O_4$ thin film layer, allowing the ions to be injected into the lattices. The injected ions may cause lattice distortion and, depending on the degree of distortion, intralattice defects may occur.

The degree of distortion may be adjusted depending on the degree of ion injection (voltage and time). As the voltage initially applied reduces, more ions may be injected into the $Mn3O_4$ thin film layer, increasing lattice distortion. The defects may include vacancies, oxygen vacancies, or boundaries. If the lattice bonds are broken by worsening the lattice distortion, ultra-fine particles (the first nanoparticles) may be generated and, at this time, some of the first nanoparticles may be reduced into the second nanoparticles. If the voltage is further lowered, the ions may be alloyed with the Mn metal, resulting in the formation of a manganese alloy. Thus, a caution needs to be taken. Such a proper amount of ions as to break the lattice bonds needs to be injected. Injection of less ions may cause defects but fail to break the bonds, and injection of more ions may result in the formation of a manganese alloy.

It is preferable to place the metal sheet on the $Mn3O_4$ thin film layer. By its conductivity, the metal sheet may transfer electrons to the $Mn_3O_4$ thin film layer. As such, because the metal sheet is stable upon injecting alkaline metal or alkaline earth metal ions into the $Mn3O_4$ thin film layer by applying voltage, application of the metal sheet is preferable.

To separate the porous manganese oxide nanoparticles in the form of flocculated primary nanoparticles represented as in chemical formula 1 or 2, the $Mn_3O_4$ thin film layer, the ion generation layer, and the separation plate are disassembled to separate the $Mn_3O_4$ thin film layer off, and the $Mn_3O_4$ thin film layer is washed with an organic solvent.

The organic solvent washes the electrolyte off the $Mn_3O_4$ thin film layer. According to reactions, additional washing may be performed with distilled water and/or an acid solution of 0.1 mM to 1 mM.

The organic solvent may include acetone, ethanol, tetrahydrofuran (THF), benzene, KOH/MeOH, MeOH, toluene, CH2Cl2, hexane, dimethylformamide (DMF), di-isopropyl ether, diethyl ether, dioxane, dimethylacetamide (DMA), dimethyl sulfoxide (DMSO), or chlorobenzene.

Specifically, the flocculated porous manganese oxide nanoparticles taken off while the binder is washed off the $Mn_3O_4$ thin film layer by the organic solvent are put aside, and the remaining alkaline metal or alkaline earth metal ions are washed out with distilled water. In some case, additional washing may be carried out with the acid solution, and water is injected for neutralization. The washed-off porous manganese oxide nanoparticles may be dispersed in water or organic solvent or may be dried into a powder.

Embodiment

Hereinafter, embodiments of the present disclosure are described in detail. However, the scope of the disclosure is not limited thereto.

Example of manufacturing a device for preparing porous manganese oxide nanoparticles The $Mn_3O_4$ powder (commercially available from Avention, Inc., 0.94 g), Super-p (commercially available from MTI Korea, 0.03 g), and polyvinylidene fluoride (commercially available from Sigma-Aldrich, 0.03 g) were mixed together, and N-methyl-2-pyrrolidone (1 mL) (NMP, commercially available from Sigma-Aldrich) of 1 mL was added to the mixture, thus preparing slurry. The slurry was casted on a 25 μm-thick copper sheet and was then dried in a vacuum oven, forming a 200 μm-thick $Mn_3O_4$ thin film layer. The formed $Mn_3O_4$ thin film layer was cut to a size of 8×8 $cm^2$. A 400 μm-thick stainless steel (Sigma-Aldrich) sheet was cut to a size of 10×10 $cm^2$ and was used as an electrode. The electrode was placed on a case, with the copper sheet contacting the electrode, thereby forming an ion injector. A 20 μm-thick, 12×12 $cm^2$-sized polypropylene plate was placed on the $Mn_3O_4$ thin film layer of the ion injector. 1M of LiPF6 EC/DEC electrolyte was dropped on the polypropylene plate and then was wet, forming a separation plate. A 400 μm-thick lithium sheet was cut to a size of 10×10 $cm^2$ and was placed on the electrode on the case, forming an ion generation layer. The separation plate was positioned between the $Mn_3O_4$ thin film layer and the lithium sheet, and the case was fastened up so that each layer inside comes in tight contact.

Figure 2:
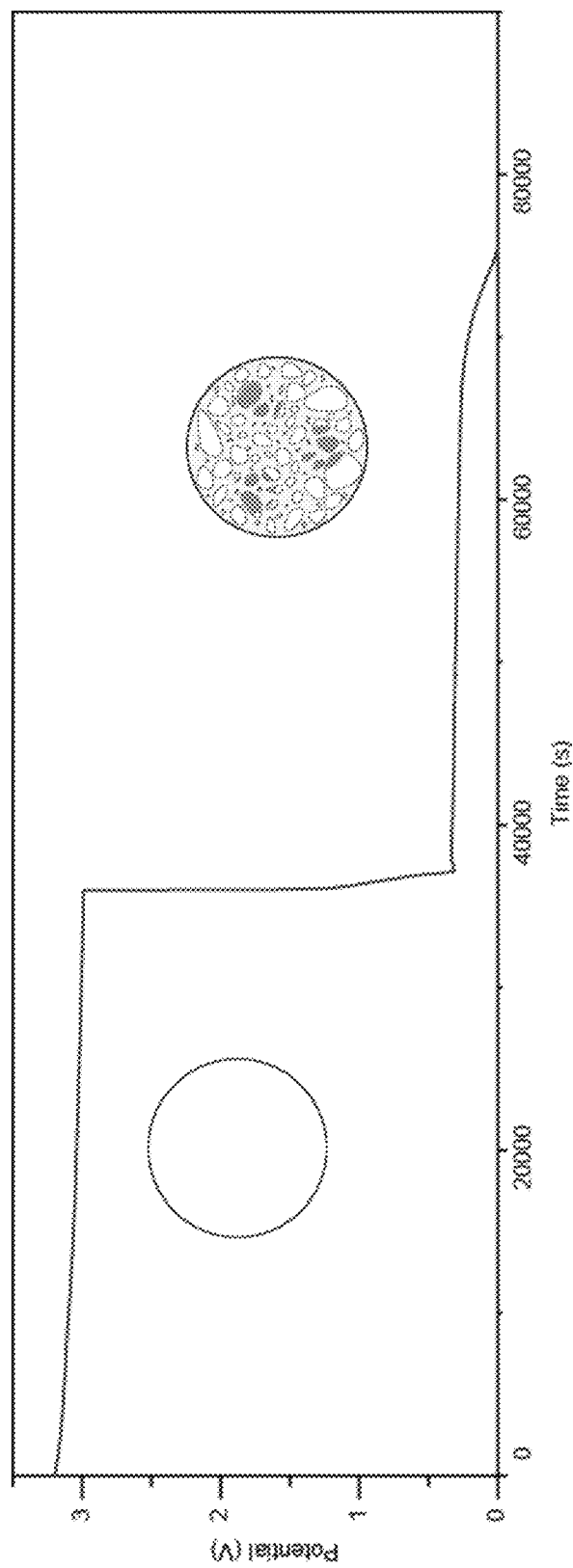
FIG. 2 is a galvanostatic cycling with potential limitation (GCPL) of porous manganese oxide nanoparticles preparing device according to an embodiment.

The reaction of the $Mn_3O_4$ thin film layer according to application of a voltage to the porous manganese oxide nanoparticles preparing device was measured and shown in FIG. 2.

An open circuit voltage in the so-manufactured porous manganese oxide nanoparticles preparing device was measured, and a resultant value of about 3V relative to lithium was obtained. Thereafter, as a constant current of −200 μA is applied, the voltage gradually reduces from 3V and reaction thus occurs. If a reaction occurs, the curve turns flat at a specific reaction voltage. This indicates that a specific reaction continues to occur at the specific voltage, and the application of current continues until the reaction ends. The application of current may be regarded as the reaction occurring as, as many lithium ions as the number of electrons move.

Resultantly, between 1.2V and 0.8V, a conversion reaction is caused by the lithium ions and, as oxygen is taken off $Mn_3O_4$, the bonds increase in the early stage but, later, gradually decrease, so that atomization begins while $Mn_3O_4$ partially reduces into $MnO_2$. Then, at a lower voltage, an alloying reaction arises in which the lithium ions enter the $Mn_3O_4$ lattices, forming a new phase.

Embodiment: preparation of porous manganese oxide nanoparticles

−200 uA/$cm^2$ was applied to the porous manganese oxide nanoparticles preparing device, which was manufactured as above, to apply up to 0V (vs. Li+/Li). After the reaction ends, the porous manganese oxide nanoparticles preparing device was disassembled, and the $Mn_3O_4$ thin film layer was taken apart. The leftover electrolyte was washed off the $Mn_3O_4$ thin film layer using acetone. Next, the particles, taken off while the binder was washed off with the organic solvent, were put aside. Or, if not taken off by the organic solvent, the particles may be physically scrapped off and then put aside. Then, the taken-off particles were washed with 1 mM of acetone and then with water, thereby obtaining porous manganese oxide nanoparticles.

Comparative example: $Mn_3O_4$ particles

A $Mn_3O_4$ powder (commercially available from Avention Inc., 20 nm) as used in the preparation example was used in the comparative example.

EXPERIMENTAL EXAMPLE

Experimental Example: TEM Measurement

Figure 3:
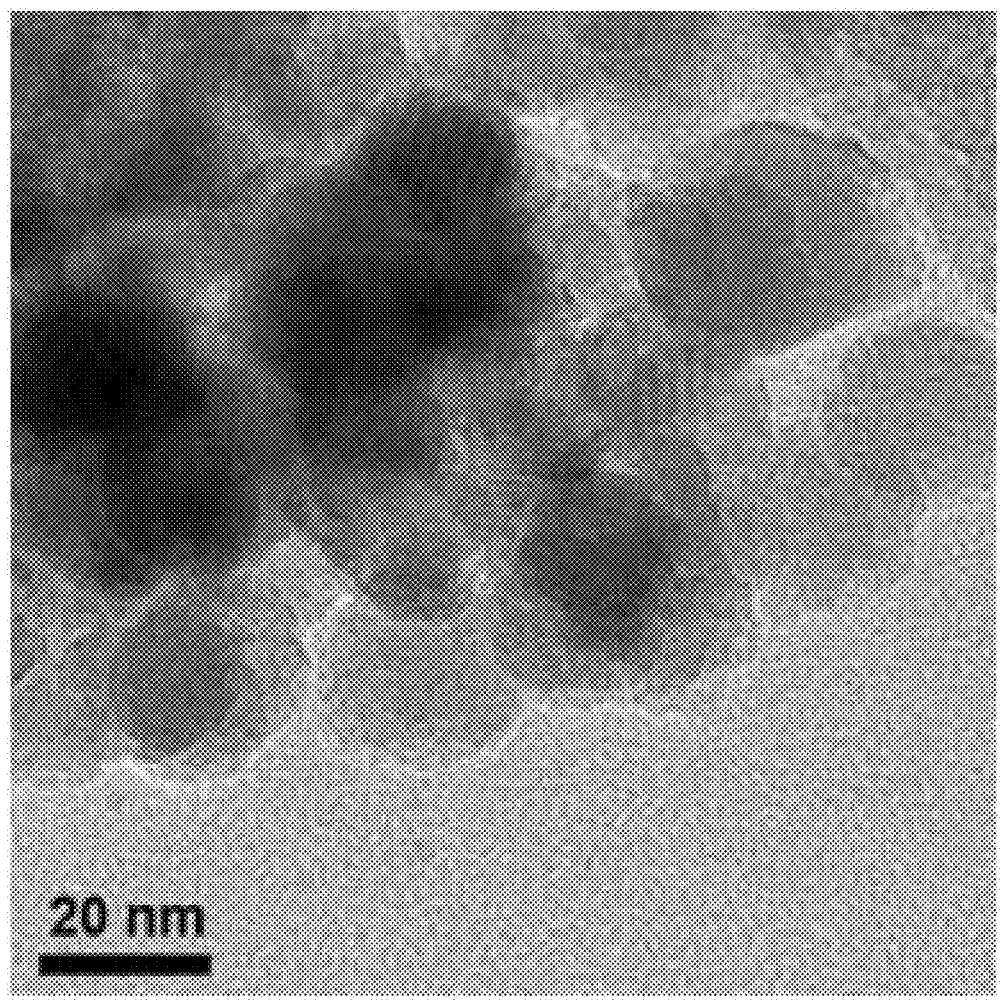
FIG. 3 is a view illustrating the results of TEM measurement on a comparative example.
Figure 4:
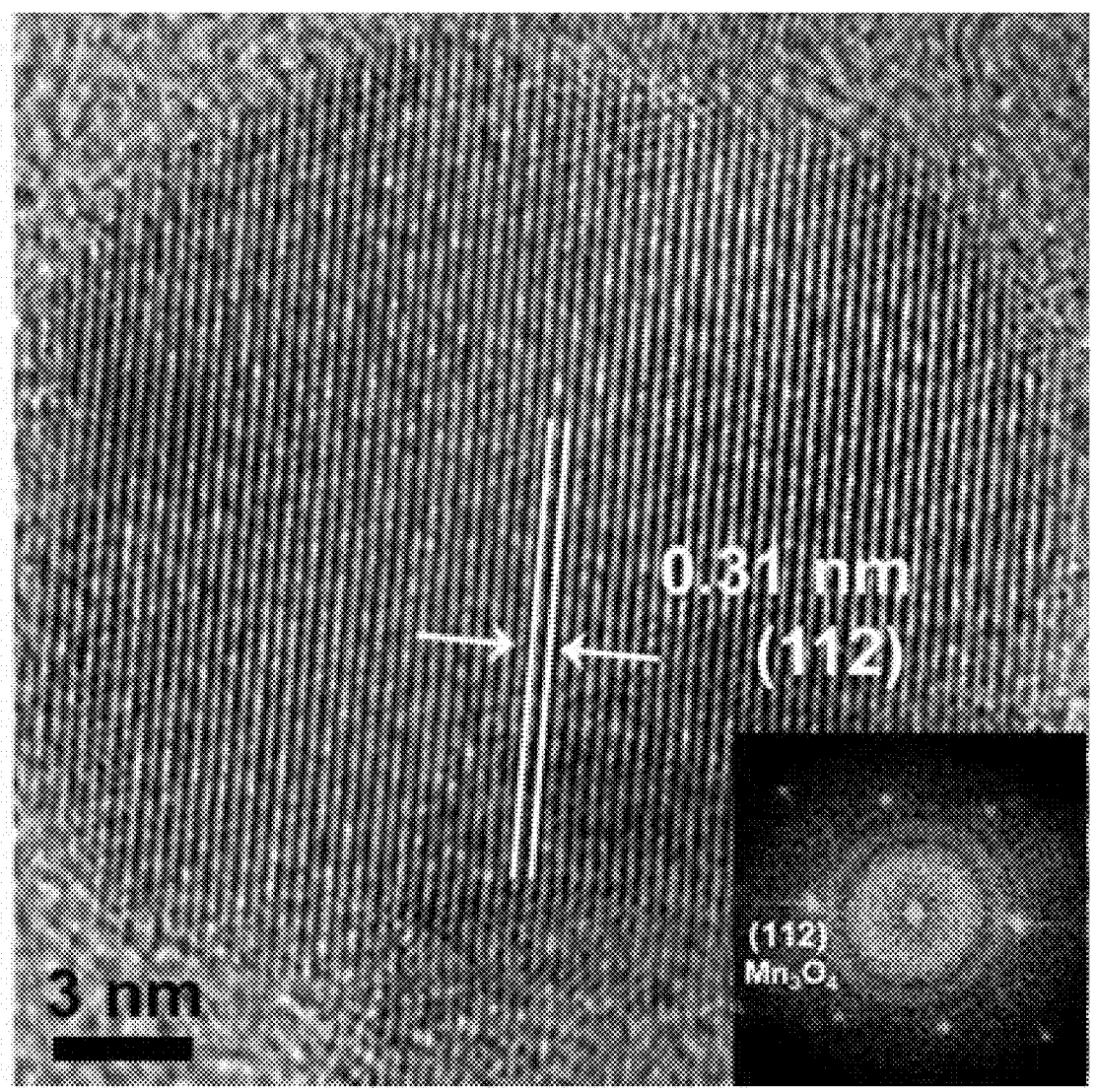
FIG. 4 is a view illustrating the results of high-resolution TEM measurement on a comparative example.
Figure 5:
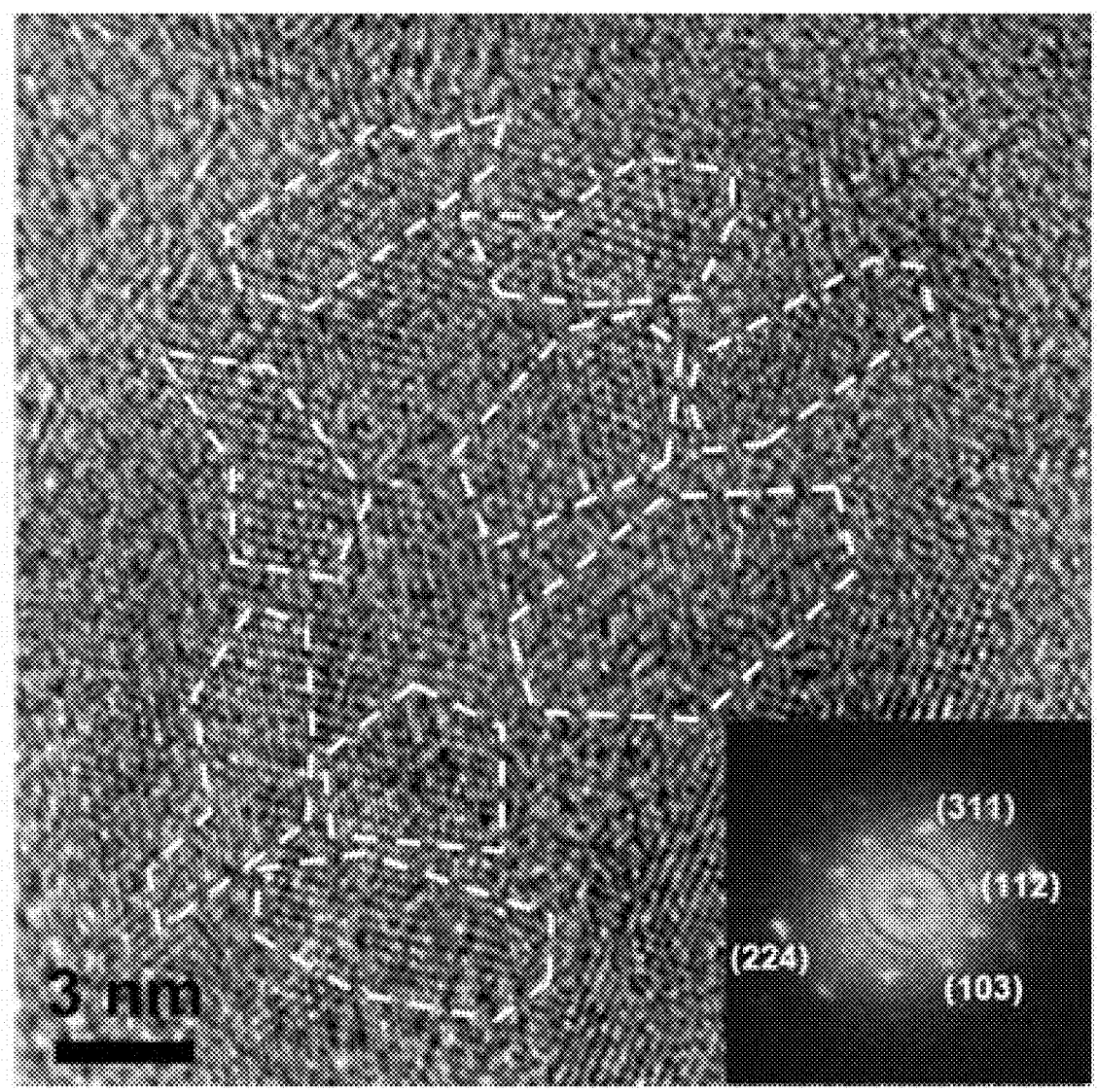
FIG. 5 is a view illustrating the results of TEM measurement on an embodiment.

FIG. 3 illustrates the results of TEM measurement on the comparative example, FIG. 4 illustrates the results of high-resolution TEM measurement on the comparative example, and FIG. 5 illustrates the results of TEM measurement on an embodiment of the disclosure.

Referring to FIGS. 3 to 5, it may be identified that while the conventional $Mn_3O_4$ powder has a particle size of about 20 nm, the porous manganese oxide nanoparticles, according to an embodiment, includes about 5 nm primary nanoparticles. It is also identified that the $Mn_3O_4$ primary nanoparticles are partially reduced into $MnO_2$ primary nanoparticles.

What is claimed is:

1. Porous manganese oxide nanoparticles configured in a flocculated form of both primary nanoparticles represented as in chemical formula 1 and primary nanoparticles represented as in chemical formula 2, wherein air pores are formed between the primary nanoparticles, wherein $$Mn_3O_{4-x} \quad \text{[Chemical formula 1]}$$

wherein $0 \leq x \leq 0.4$.

$$MnO_2\text{-}y \quad \text{[Chemical formula 2]}$$

wherein $0 \leq x \leq 0.2$, and wherein the primary nanoparticles represented as in chemical formula 1 or 2 have a particle size of 6 nm or less.

2. The porous manganese oxide nanoparticles of claim 1, wherein
a volume ratio of the primary nanoparticles represented as in chemical formula 1 to the primary nanoparticles represented as in chemical formula 2 ranges from 10% to 90%.

3. The porous manganese oxide nanoparticles of claim 1, wherein
the primary nanoparticles represented as in chemical formula 1 and the primary nanoparticles represented as in chemical formula 2 are uniformly mixed and flocculated.

4. The porous manganese oxide nanoparticles of claim 1, wherein
the primary nanoparticles represented as in chemical formula 1 or 2 have a size ranging from 0.3 nm to 6 nm.

5. The porous manganese oxide nanoparticles of claim 1, wherein
the porous manganese oxide nanoparticles have a porosity ranging from 10% to 40%.

6. The porous manganese oxide nanoparticles of claim 1, wherein
the air pores have a size ranging from 0.4 nm to 6 nm.

7. The porous manganese oxide nanoparticles of claim 1, wherein
the porous manganese oxide nanoparticles have a BET specific surface area ranging from 60 $m^2/g$ to 120 $m^2/g$.

8. Porous manganese oxide nanoparticles prepared by forming first nanoparticles represented as in chemical formula 1 in such a method as to separate Mn clusters by injecting positive ions into lattices of $Mn_3O_4$ particles and forming second nanoparticles represented as in chemical formula 2 by partially reducing the first nanoparticles, wherein $$Mn_3O_{4-x} \quad \text{[Chemical formula 1]}$$

wherein $0 \leq x \leq 0.4$.

$$MnO_2\text{-}y \quad \text{[Chemical formula 2]}$$

wherein $0 \leq x \leq 0.2$, and wherein the first nanoparticles represented as in chemical formula 1 or the second nanoparticles represented as in chemical formula 2 have a particle size of 6 nm or less.

9. The porous manganese oxide nanoparticles of claim 8, wherein
a volume ratio of the first nanoparticles represented as in chemical formula 1 to the second nanoparticles represented as in chemical formula 2 ranges from 10% to 90%.

10. The porous manganese oxide nanoparticles of claim 8, wherein
the first nanoparticles represented as in chemical formula 1 and the second nanoparticles represented as in chemical formula 2 are uniformly mixed and flocculated.

11. The porous manganese oxide nanoparticles of claim 8, wherein
the positive ions are positive ions of an alkaline metal or an alkaline earth metal.

12. The porous manganese oxide nanoparticles of claim 8, wherein
the positive ions are injected using a constant current or constant voltage method.

* * * * *